United States Patent [19]
Catanzarite et al.

[11] Patent Number: 6,070,681
[45] Date of Patent: Jun. 6, 2000

[54] CONTROLLABLE CAB SUSPENSION

[75] Inventors: David M. Catanzarite, Edinboro, Pa.; Kenneth A. St. Clair, Cary; Robert H. Marjoram, Holly Springs, both of N.C.

[73] Assignee: Lord Corporation, Cary, N.C.

[21] Appl. No.: 08/876,656

[22] Filed: Jun. 13, 1997

[51] Int. Cl.[7] .............................................. B62D 33/067
[52] U.S. Cl. ................................... 180/89.15; 180/89.15
[58] Field of Search ........................... 180/89.13–89.15; 280/6.514; 188/266.5

[56] References Cited

U.S. PATENT DOCUMENTS

| | | | |
|---|---|---|---|
| 3,807,678 | 4/1974 | Karnopp et al. | 248/358 R |
| 4,029,305 | 6/1977 | Schubert et al. | 267/65 R |
| 4,452,329 | 6/1984 | Stone et al. | 180/89.15 |
| 4,463,818 | 8/1984 | Sonneborn | 180/89.15 |
| 4,483,409 | 11/1984 | Fun | 180/89.15 |
| 4,506,751 | 3/1985 | Stephens | 180/89.15 |
| 4,821,849 | 4/1989 | Miller | 188/280 |
| 4,881,172 | 11/1989 | Miller | 364/424.05 |
| 4,887,699 | 12/1989 | Ivers et al. | 188/378 |
| 4,936,425 | 6/1990 | Boone et al. | 188/299 |
| 5,018,606 | 5/1991 | Carlson | 188/267 |
| 5,029,677 | 7/1991 | Mitsui | 188/267 |
| 5,044,455 | 9/1991 | Tecco et al. | 180/89.13 |
| 5,209,316 | 5/1993 | Bauer | 180/89.14 |
| 5,276,622 | 1/1994 | Miller et al. | 364/424.05 |
| 5,276,623 | 1/1994 | Wolfe | 364/424.05 |
| 5,277,281 | 1/1994 | Carlson et al. | 188/267 |
| 5,284,330 | 2/1994 | Carlson et al. | 267/140.14 |
| 5,338,058 | 8/1994 | Ohtagaki et al. | 280/707 |
| 5,388,811 | 2/1995 | Marjoram | 267/140.13 |
| 5,390,121 | 2/1995 | Wolfe | 364/424.05 |
| 5,396,973 | 3/1995 | Schwemmer et al. | 188/299 |
| 5,398,917 | 3/1995 | Carlson et al. | 267/140.14 |
| 5,485,417 | 1/1996 | Wolf et al. | 364/424.01 |
| 5,492,312 | 2/1996 | Carlson | 267/140.14 |
| 5,522,481 | 6/1996 | Watanabe | 188/267 |
| 5,547,049 | 8/1996 | Weiss et al. | 188/267 |
| 5,555,501 | 9/1996 | Furihata et al. | 364/424.05 |
| 5,570,286 | 10/1996 | Margolis et al. | 364/424.05 |
| 5,582,385 | 12/1996 | Boyle et al. | 248/550 |
| 5,603,387 | 2/1997 | Beard et al. | 180/89.12 |
| 5,623,410 | 4/1997 | Furihata | 364/424.046 |
| 5,642,282 | 6/1997 | Sonehara | 364/424.046 |
| 5,701,245 | 12/1997 | Ogawa et al. | 364/424.046 |
| 5,822,709 | 10/1998 | Fujita | 701/70 |
| 5,878,851 | 3/1999 | Carlson et al. | 188/269 |
| 5,954,149 | 9/1999 | Williams | 180/89.12 |

OTHER PUBLICATIONS

"Ride Quality on Command" Link Mfg. Ltd. Brochure.
"FluidAir Cab Suspension Systems" Lord Corporation Brochure; Nov. 1991.
Carlson, et al.; "A Growing Attraction to Magnetic Fluids" Aug. 8, 1994.
"Rheonetic™ Systems—A New Dimension in Vibration Control"; Lord Corporation Brochure; Aug. 1994.
"Rheonetic™ Ride—For the Smoothest Ride of Your Life"; Lord Corporation Brochure.
"Five Reasons to Spec CabCushion™ Air Cab Suspension" Power–Packer Brochure; Feb. 24, 1997.

*Primary Examiner*—Chris Schwartz
*Attorney, Agent, or Firm*—Randall S. Wayland

[57] ABSTRACT

A controllable secondary suspension system (20) for vehicle cabs (18) and the like which flexibly suspends and controls movement of the vehicle's cab (22) relative to the vehicle's frame (24). The system (20) includes at least one flexible support (26), which are preferably two spaced apart air springs flexibly suspending the cab (22) relative to the frame (24), at least one controllable fluid damper, and preferably two spaced-apart controllable fluid dampers, such as Magnetorheological (MR) fluid dampers (28, 28'), interconnected between the cab (22) and the frame (24). In one aspect, the system (20) may include at least one sensor, such as a relative position sensor (30), for providing relative vibration information between the cab (22) and the frame (24), and a controller (36) for processing the relative vibration information to determine current to be supplied to the controllable fluid damper (28) to control the degree of damping thereof. Signals from additional sensors, such as a speed sensor (32), steering angle sensor (34), brake sensor (46), throttle position sensor (48), and vertical and lateral acceleration sensors (40, 44) may be used to enhance control. Roll, pitch, lurch and ride may be simultaneously or independently controlled.

26 Claims, 10 Drawing Sheets

| A | B |
|---|---|
| -1.0 | 1.00 |
| -0.9 | 0.40 |
| -0.8 | 0.22 |
| -0.7 | 0.10 |
| -0.6 | 0.05 |
| -0.5 | 0.03 |
| -0.4 | 0.00 |
| -0.3 | 0.00 |
| -0.2 | 0.00 |
| -0.1 | 0.00 |
| 0.0 | 0.00 |
| 0.1 | 0.00 |
| 0.2 | 0.00 |
| 0.3 | 0.00 |
| 0.4 | 0.00 |
| 0.5 | 0.03 |
| 0.6 | 0.05 |
| 0.7 | 0.10 |
| 0.8 | 0.22 |
| 0.9 | 0.40 |
| 1.0 | 1.00 |

Fig. 21

CONTROLLABLE CAB SUSPENSION

FIELD OF THE INVENTION

This invention relates generally to the area of controllable devices and systems. Specifically, it relates to controllable systems and apparatus which employ dampers which exhibit controllable damping and/or stiffness characteristics.

BACKGROUND OF THE INVENTION

Dampers, shock absorbers, brakes and clutches are known which use a fluid as the working medium to create damping forces/torques to control vibration (translational or rotational). One class of these devices are termed "controllable" and employ Electrorheological controllable fluids (ER), Electrophoretic fluids (EP), Magnetorheological fluids (MR), or Hydraulic fluids (Semi-Active Electromechanical), etc. Of particular interest are "controllable fluid devices" (otherwise known as field responsive devices), i.e., devices which have a contained fluid which responds to an applied field (electric or magnetic). One particular type of "controllable fluid device" is a Magnetorheological (MR) fluid device. MR fluid devices may be of the rotary or linear-acting (translational) variety, such as controllable fluid MR dampers, MR brakes, or MR clutches. They employ a controllable MR fluid comprised of fine soft-magnetic particles disbursed within a liquid carrier. Typical particles include carbonyl iron having various shapes, but which are preferably approximately spherical, and which exhibit mean dimensions of about 0.1 to 500 $\mu$m, and more preferably between 1 and 100 $\mu$m. The carrier fluids include various known hydraulic oils, silicone oils, and the like.

MR fluids exhibit a "thickening" behavior (a rheology change), sometimes referred to as an "apparent viscosity change", upon being exposed to a magnetic field of sufficient strength. The higher the magnetic field strength exposed to the MR fluid, the higher the damping force that can be achieved within the particular MR device. Examples of prior art MR fluids can be found in commonly assigned WO 94/10694. Notably, MR fluid devices provide ease of controllability through simple variations in electrical current supplied thereto. In particular, MR fluids and devices have demonstrated excellent durability as compared to ER devices (ER fluids exhibit a rheology change upon being exposed to an electric field) and simplicity previously unachievable with controllable semi-active hydraulic devices (which include electro-mechanically actuated valves).

Descriptions of prior art MR controllable fluid devices can be found in commonly assigned U.S. Ser. No. 08/674, 179 entitled "Controllable Vibration Apparatus", and U.S. Pat. Nos. 5,547,049, 5,492,312, 5,398,917, 5,284,330, and 5,277,281. Notably, these devices provide real time-variable control forces.

Generally known cab suspensions comprise a cab, a chassis or frame, air springs flexibly supporting the cab relative to the frame, and a plurality of "passive" hydraulic dampers (commonly known shock absorbers) for providing stabilizing damping forces between the cab and frame. On one hand, the air springs, which provide low spring rates are needed for good isolation. See, for example, U.S. Pat. No. 4,029,305 to Schubert, which teaches a pneumatic isolator and suspension system. On the other hand, the hydraulic dampers must be highly damped to limit motions upon encountering large transient loads between the cab and frame, such as due to cab roll. Therefore, by design, the ride cannot be as good as might be achieved if lower dampiung rates could be used. In short, the need for low stiffness to achieve excellent vibration isolation has the drawback of allowing large transient motions upon encountering large transient forces, which can cause instability.

To solve this problem, the afore-mentioned prior art systems added highly damped passive dampers, thereby generally degrading ride quality. This is due to the fact that very high damping rates in the passive dampers cannot be used without having the concomitant result of producing a harsh ride. Furthermore, although these systems provide good vibration isolation, they cannot adequately damp large transient motions. For example, suspension systems including passive dampers still allow large cab roll angles during cornering or abrupt maneuvers, especially on trucks having a high center of gravity. Moreover, large pitch (dive) angles may still occur during abrupt braking, especially on cab-over truck designs. Furthermore, the cab may lurch upon rapid acceleration or when encountering rough terrain (pot holes, uneven or dirt parking lots, or generally rough roads). Therefore, there is a need for a simple, cost effective suspension system that can control these transient motions without degrading ride.

Some systems have been developed which use pneumatics to reposition a flow restrictor valve in the damper to control the level of damping from a high damped level to a low damped level by adjusting the valve position in the damper from a high damping state to a low damping state. One such system, called the LINK RIDE COMMAND driver controlled ride system is available from Link Mfg. Ltd. of Sioux Center, IA. Other known systems include a moveable damping valve which closes off fluid flow in one direction is taught in U.S. Pat. No. 4,506,751 to Stephens. Notably, in these systems it is difficult to fully lock up the cab upon encountering such transient conditions. Further, they have moving parts in the valve which tend to be expensive and unreliable.

More sophisticated fully active systems have also been employed to solve pitching due to braking and cab roll. Certain of these systems can be found in U.S. Pat. No. 4,483,409 to Fun, U.S. Pat. No. 5,044,455 to Tecco et al., and U.S. Pat. No. 5,555,501 to Furihata et al. While fully active systems may solve some of these problems, they are very expensive, require large amounts of power, and are very complicated. Therefore, there is a long felt and unfulfilled need for a cab suspension system which can solve the afore-mentioned problems associated with the prior art passively-damped suspension systems, yet which is cost effective, has low power requirements, and is simple to retrofit to existing platforms.

SUMMARY OF THE INVENTION

The present invention is a controllable cab suspension system for truck cabs, farm tractor cabs, cabs on construction vehicles, and the like, which may be used for controlling dynamic vibration (ride control), or for simply providing a controllable level of damping between the cab and frame. Furthermore, in another aspect, the invention can react to, and control, large transient vehicle body motions, for example cab roll, pitch (such as due to braking or rapid acceleration), or other transient motions between of cab and frame. In particular, the controllable cab suspension system may be used to substantially lock up relative motion between the cab and frame upon command of a very small electrical current to the controllable damper. The controllable suspension system comprises one or more "controllable fluid dampers" (preferably of the Magnetorheological (MR) type) interconnected between the cab and the frame, one or more flexible members (preferably air springs) interconnected between, and which flexibly support the cab relative to the frame, and means for controlling the damping of said one or more controllable fluid dampers.

The means for controlling damping of the one or more controllable fluid dampers may comprise a controller which receives one or more inputs from a sensor or sensors. In its simplest form, the means for controlling damping would include the driver selecting a level of damping. In all controlled embodiments, preferably, at least one sensor (such as a displacement sensor) provides vibration information about the cab, and preferably relative displacement between the cab and frame. Preferably also, electronic controller (such as a digital microprocessor) processes the vibration information to determine a current to be supplied to the controllable fluid damper, thereby controlling the level of damping thereof. By the term "controllable fluid damper", it is meant to include devices, of whatever form, which produce controllable damping forces via fluid characteristics which are changeable when exposed to a field (magnetic or electrical), such as in magnetorheological fluid dampers, electrorheological fluid dampers, electrophoretic fluid dampers, and the like.

Accordingly, it is an advantage of a first aspect of the present invention controllable cab suspension system that damping may be user adjusted to range from a "soft" ride condition to "firm" ride condition, while that ride setting is overridden in the case of encountering large transient motions.

It is also an advantage that the controllable cab suspension system that better vibration isolation may be achieved as compared to passively damped suspension systems in a simple, efficient, and cost effective system.

It is an advantage in another aspect that bottoming out between the cab and frame and topping out of the damper may be greatly reduced through appropriate end stop control.

It is an advantage in another aspect that motion of the cab may be substantially locked up relative to the frame, such that there is little or no relative motion therebetween.

It is also an advantage of the controllable cab suspension system that the relative transient motion between the cab and frame during roll, braking, or acceleration (lurch) may be dramatically reduced.

It is another advantage that the controllable cab suspension system may control roll proactively based upon sensor inputs which cause the roll phenomena, such as speed and steering angle sensor inputs.

It is an advantage of the controllable cab suspension system that roll and ride, pitch and ride, or all three may be simultaneously controlled.

It is an advantage of the controllable cab suspension system that cab leveling may also be controlled by the system.

It is an advantage in another aspect of the controllable cab suspension system that small amounts of cab roll, pitch, or lurch may be controlled without fully degrading ride.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE PREFERRED EMBODIMENTS

Figure 1:
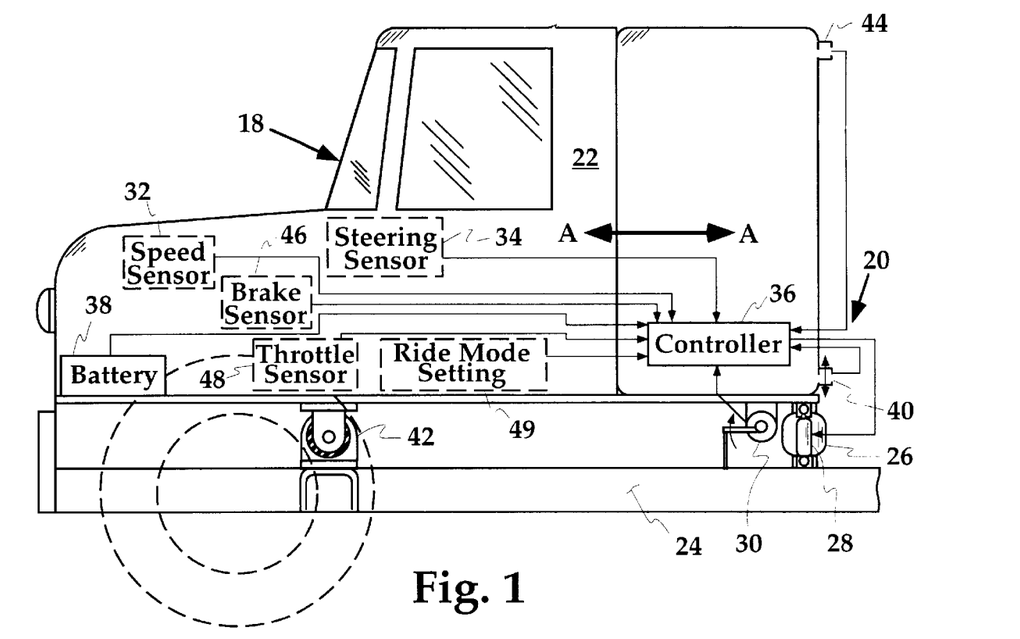
FIG. 1 is a partial side view of a first embodiment of a controllable cab suspension system installed on a truck cab including a sleeper section.
Figure 2:
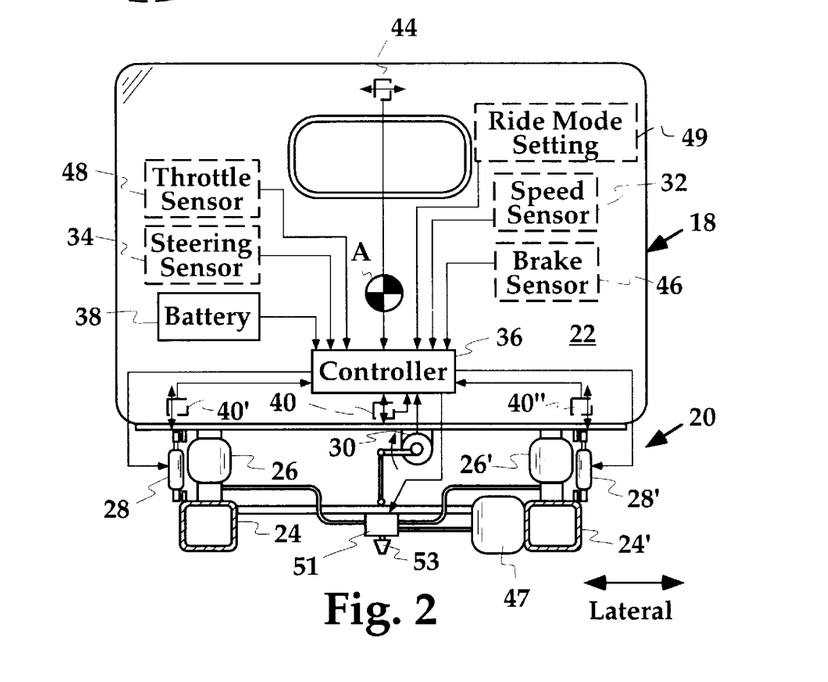
FIG. 2 is a rear view of the controllable cab suspension system of FIG. 1.

Referring now to the Drawings where like numerals denote like elements, in FIG. 1 and FIG. 2, shown generally at 20, is a first embodiment of controllable cab suspension system for flexibly suspending a cab 22 relative to interconnected frame members 24, 24' within a vehicle 18, such as a truck, farm tractor, construction vehicle, or the like. The system 20 is useful for controlling either the ride quality of the cab 22, or alone or in combination with, controlling large transient motions, such as cab roll or pitch brought about due to abrupt maneuvers and/or rough terrain conditions.

In particular, the present invention may optionally control transient motions due to quick lane changes, abrupt braking, fast acceleration, rough roads, encounters with potholes, and other like events bringing about large transient motions. The controllable cab system 20 is preferably used in combination with another mounting system, such as a pair of transversely mounted front pivot mounts 42 (only one shown) which support some of the cab's weight, and about which, the cab 22 may preferably pivotally pitch about a transverse axis. Generally, a pivot point is provided at some point forward of the controllable cab suspension system 20, and preferably as far forward as is practicable. This pivot may be optionally provided by soft or hard pivots, air springs, etc.

In more detail, the controllable cab suspension system 20 comprises at least one flexible member, and more preferably, two laterally (transversely) spaced-apart flexible members 26, 26' which are soft in the vertical direction and flexibly support the vertical weight of the cab 22 while isolating vibrations between the frame rails 24, 24' and cab 22. Preferably, the flexible members 26, 26' are air springs, or other like soft spring elements, and are spaced about on either side of a forward-extending longitudinal roll axis A—A and are rigidly attached at their ends between the cab 22 and frames 24, 24'. As will be described further herein, the internal pressure in the flexible members (air springs) 26, 26' may be adjusted to control ride height, i.e., to accomplish leveling of the cab 22 needed due to weight variations, etc.

The controllable suspension system 20 also includes at least one controllable damper whose damping characteristics may be quickly adjusted (preferably on the order of 15 milliseconds or less), and preferably two controllable fluid dampers 28, 28', which in a best mode are Magnetorheological fluid dampers (hereinafter MR dampers). The controllable dampers 28, 28' are also preferably spaced apart and located on either side of the longitudinal roll axis A—A. Preferably, the controllable dampers 28, 28' will be spaced in a position laterally outboard of the flexible members (air springs) 26, 26', such that their ability to restrain roll of the cab 22 is maximized. Preferably, the dampers 28, 28' will be spaced apart by about 3 feet or more.

Figure 6:
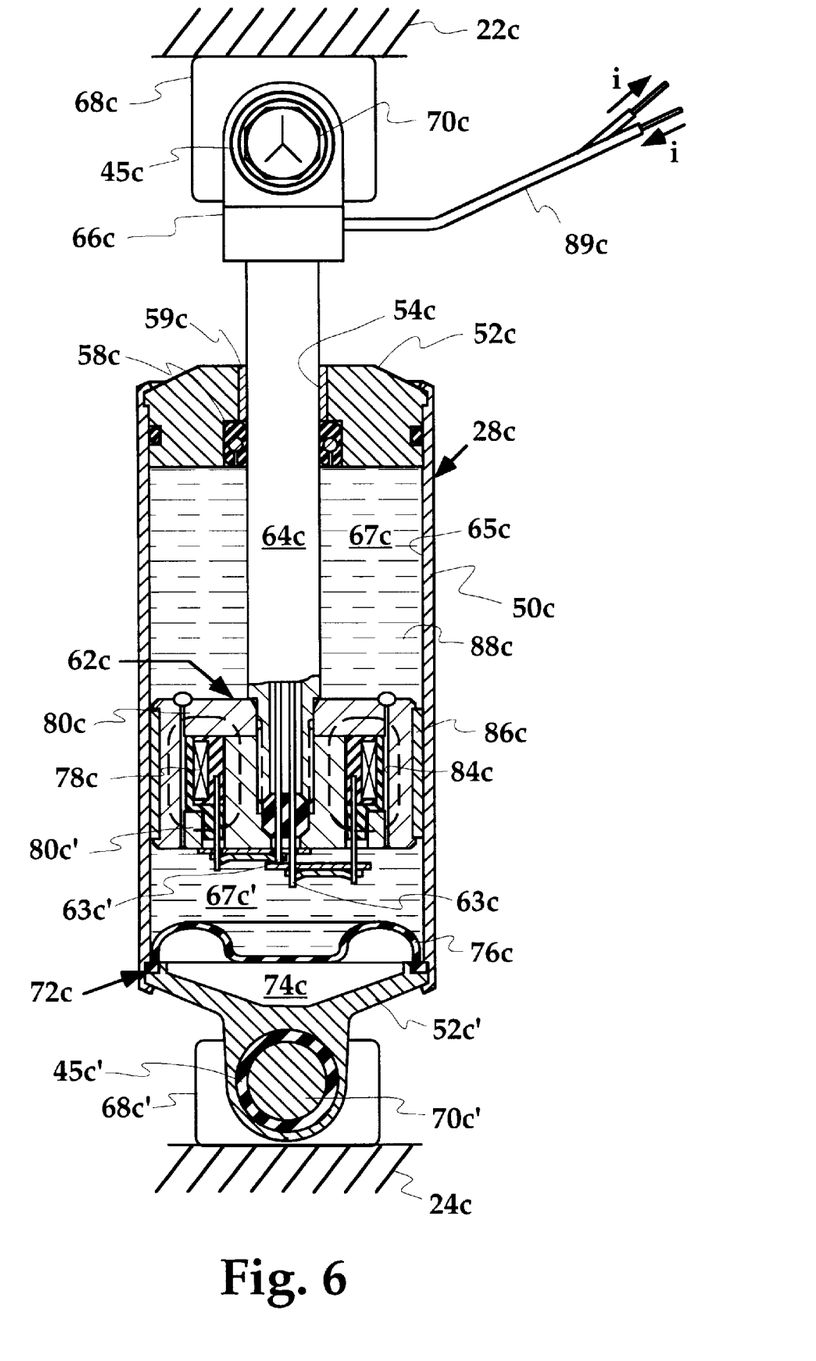
FIG. 6 is a partial cross-sectioned side view of a Magnetorheological (MR) damper.

A description of a controllable MR damper may be found with reference to FIG. 6. More complete descriptions may be found in U.S. Pat. No. 5,277,281 to Carlson et al. entitled "Magnetorheological Fluid Dampers" and in U.S. application Ser. No. 08/674,179 entitled "Controllable Vibration Apparatus." Controllable dampers, such as MR dampers, have the capability of being rapidly switched (in 15 milliseconds or less) and can create large damping forces even at very low velocities, a feat not possible with passive hydraulic dampers. The inventors herein discovered that controllable fluid dampers, such as the MR dampers described herein, can essentially lock up the relative motion between the cab 22 and frame members 24, 24' upon appropriate electrical commands being supplied thereto. Therefore, controllable fluid dampers are particularly advantageous for controlling roll, pitch, etc. in cabs. Other semi-active electro-mechanical hydraulic dampers used in the prior art primary suspension systems are incapable of this. By the term controllable fluid damper, it is meant to include MR, ER, EP, and other like controllable fluid dampers, where the damping characteristics are changed by applying a field (either electrical or magnetic) to a controllable fluid.

Preferably, the cab suspension system 20 also includes at least one sensor for providing vibration information about the cab 22. The at least one sensor preferably comprises a centrally-located position sensor 30 which provides a signal representative of relative vertical displacement between the cab 22 and frame 24. A rotary pot available from CTS Corp. of Elkhart, Ind. is preferred. This vertical vibration signal from position sensor 30 is appropriately conditioned and processed by the onboard, preferably digital, computer 36 to provide a ride control signal to at least one controllable damper, and more preferably, to two spaced-apart MR dampers 28, 28'. Preferably, the displacement sensor 30 is located substantially directly adjacent to, and substantially in a vertical line with, the roll axis A—A (CG or roll center), such that the sensor information from the displacement sensor 30 is minimally impacted by any roll of the cab 22 relative to frames 24, 24'. Optional vertical accelerometer 40 or vertical accelerometers 40', 40" may provide acceleration information to the controller 36 which may be used by the control to further enhance vertical ride quality of the cab 22.

Optionally, information regarding the roll condition of the vehicle 18 may be empirically derived from signals obtained from a speed sensor 32 and steering angle sensor 34. The speed information from the speed sensor 32 along with the steering angle information from the steering angle sensor 34 are preferably used in a sequence, such as a calculation, to determine the roll force estimate RFE of the cab 22. Preferably, the speed sensor 32 would comprise a hall effect rotation sensor on the drive axle, or the like, while the steering angle information would be derived from a steering angle sensor 34 attached between the steering arm and frame 24 or between the frame 24 and any other moveable suspension component which moves as a result of steering. In particular, the steering angle is taken from the steering arm, such that any play in the steering system (and thus variation in the output signal) is minimized.

The estimate for roll force RFE is preferably determined according to the equation:

$$RFE = k\, S^2/A \qquad \text{Eqn. 1}$$

where:
RFE is the roll force estimate,
k is a constant,
A is the steering angle, and
S is the forward speed of the vehicle.

Once the roll force estimate is determined, the value of roll current (the roll control signal) to be supplied is derived from an equation or lookup table. The equations or table values may include an offset or null band such that the system 20 does not react for small values of roll force estimate, but then ramps up after exceeding the null value. Alternatively, information regarding the roll condition of the vehicle cab 22 may be determined by deriving the lateral acceleration from lateral acceleration sensor 44 (see FIG. 15) or the difference (Δ) between the vertical acceleration values (See FIG. 16–18) obtained from spaced apart vertical acceleration sensors 40' and 40". However, it is preferred to use steering and speed information, as this provides the best and most proactive approach to determining the onset of roll of the cab 22.

The roll control signal generally increases, preferably in a smooth fashion, as roll force estimate increases. This roll control signal is preferably summed with any ride control signal present and any other transient control signals (ex. braking or lurch—to be described later) to increase the DC current supplied to the dampers 28, 28'. Therefore, if there is only slight roll of the cab 22, such as in light cornering, ride will not be degraded as significantly as if the maximum current was supplied to the dampers 28, 28' upon encountering a threshold. Contrarily, if a hard maneuver is encountered, such as during a radical lane change maneuver, the maximum current is provided to the dampers 28, 28' quickly and roll will be minimized by locking up relative movement between the cab 22 and frames 24, 24'. Notably, some cab roll will always occur, as the frames and their interconnections inherently provide some flexibility.

Optionally, the system 20 may also include a ride mode setting 49 which comprises user selectable settings, such as soft, firm, and locked settings. These settings provide a variable cab suspension feel. Likewise, the cab 22 may be locked up at the user's whim for situations such as jockeying or maneuvering in bumpy parking lots. With this feature lacking in prior art systems, the system 20 functions to lock up motion as though the cab 22 were essentially "hard mounted" to the frame 24. The vehicle's battery 38 provides the power needed for all of the electrical components. The entire system requires only several amperes of current to operate, thus exhibiting much lower power requirements than fully active systems.

The isolation or ride characteristics of the cab suspension system 20 may be controlled by the so-called "Rate Control Method" described in U.S. application Ser. No. 08/534,078 to Catanzarite entitled "Controllable Seat Damper System and Control Method Therefor." The controller 36 takes appropriate information from the position sensor 30 and processes it to obtain excursion rate information. From this, the appropriate ride control signal is derived and provided to the controllable damper, and preferably to both MR dampers 28, 28'. It should be understood that the displacement sensor 30 may be optionally used to provide the appropriate signals to accomplish leveling of the cab 22 also. The displacement information from sensor 30 is preferably provided to the controller 36 and air is either supplied to (from air supply 47) to inflate airbags 26, 26', or released from exhaust silencer 53, thereby deflating air springs 26, 26' via 3-way air valve 51 depending on whether the ride height is high or low. Preferably, the valve 51 is a three-way acting pneumatic valve available from NUMATECH of Wixon, Mich. Alternatively, the leveling feature can be accomplished in a separate system with a mechanical leveling valve. Commonly assigned U.S. patent application Ser. No. 08/639,139 to Catanzarite entitled "Control Method for Semi-active Damper" describes a control method (hereinafter referred to as "Modified Rate Control") which may be used to process both vertical acceleration and displacement information to control the dampers 26, 26', such as from vertical acceleration sensors 40, or 40' and 40" and displacement sensor 30.

Figure 7:
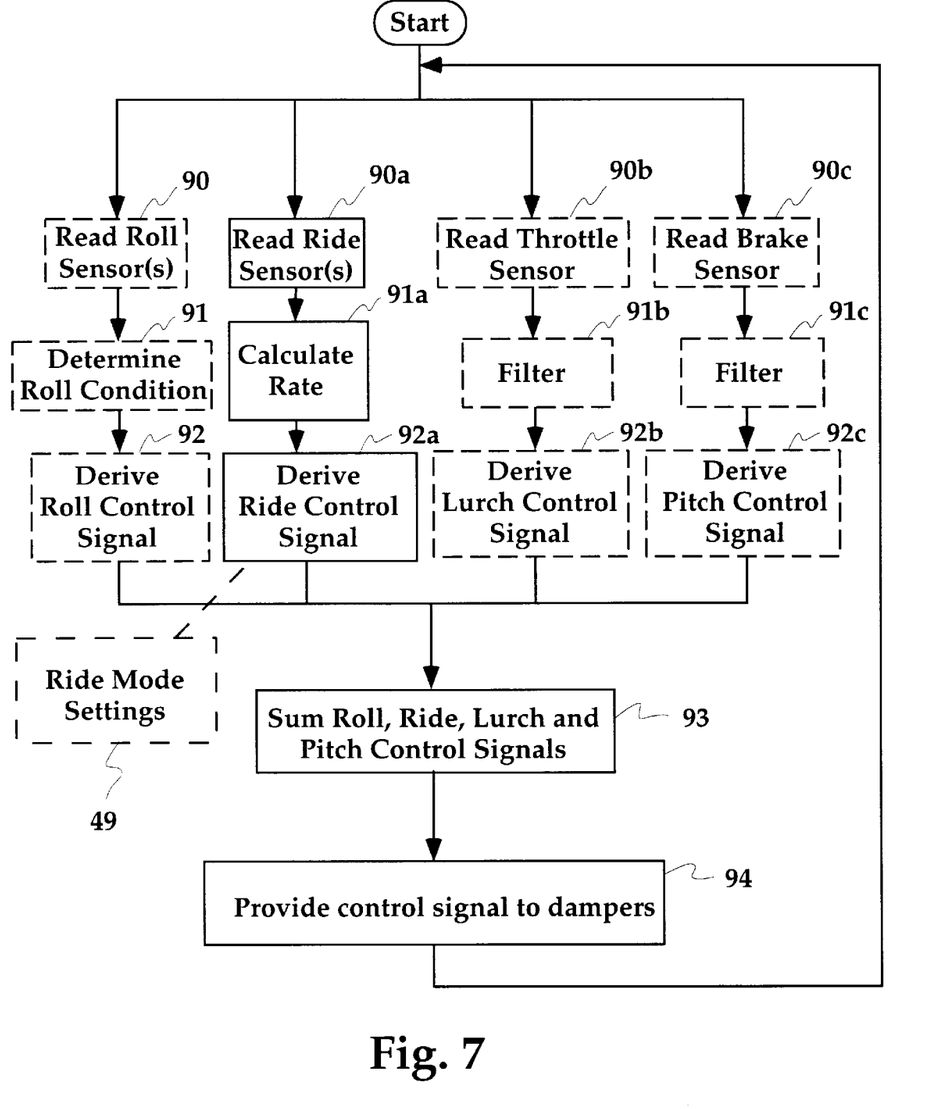
FIG. 7 is a flow diagram illustrating a preferred control for the suspension system.

As mentioned before, the cab suspension system 20 is also capable of controlling pitch of the cab 22. Pitch is preferably controlled by calculating a pitch control signal based upon brake sensor information provided by a brake pressure sensor 46. The brake pressure sensor 46 is included in the brake master cylinder, a brake line junction, or elsewhere, as appropriate in the system to provide a signal indicative of the degree of braking pressure being applied by the driver. Again, the pitch control signal can be calculated according to an equation or derived using a lookup table (See FIGS. 20b and 21). The pitch control signal is summed with the ride control signals and roll control signals (and any other control signals) to provide the appropriate total control signals to the MR dampers 28, 28' as is shown in FIG. 7. Notably, although the ride control signal will control pitch to some degree, the use of the brake pressure sensor 46 input enables faster reaction time, by responding to the brake input rather that the motion of the cab 22 resulting from braking. This is particularly advantageous on cab-over designs, which may pitch significantly upon encountering hard breaking.

Figures 19A, 19B, 19C:
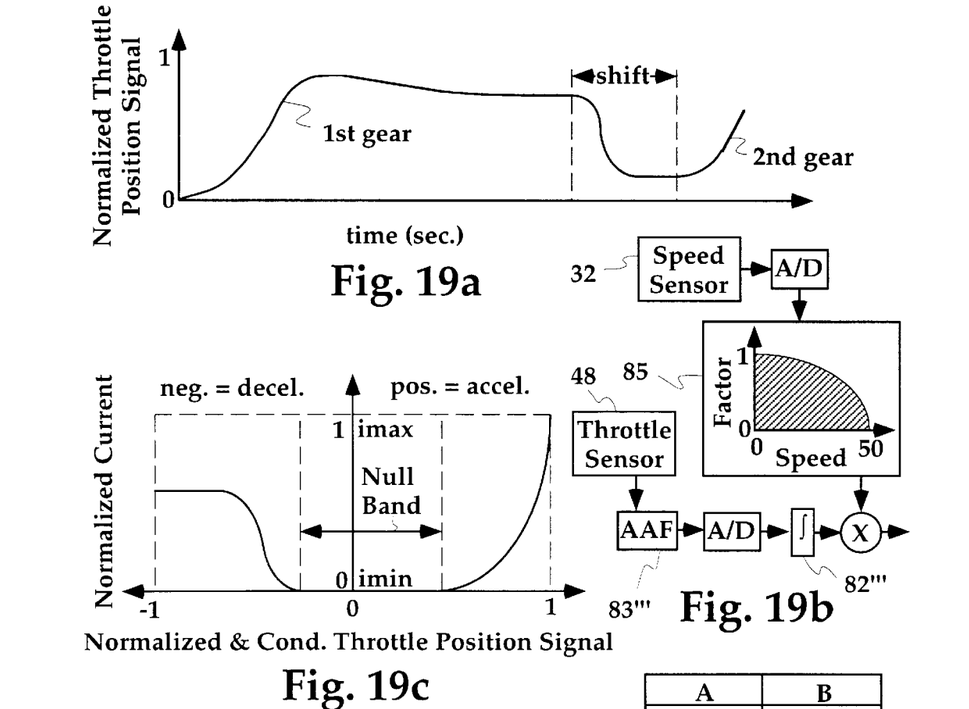
FIG. 19a is a time domain plot of Normalized Throttle Position Signal.
FIG. 19b is a block diagram illustrating processing of the throttle position signal.
FIG. 19c is a plot of Normalized and Conditioned Throttle Position Signal versus Normalized Current.

The system 20 is also capable of controlling lurch due to rapid acceleration. Lurch is a condition which occurs when the driver rapidly accelerates which causes the cab 22 to oscillate at or near its pitch resonant frequency. Lurching generally only occurs at lower speeds. FIG. 19 illustrates the type of control that may be implemented in an attempt to control lurch.

Figure 3:
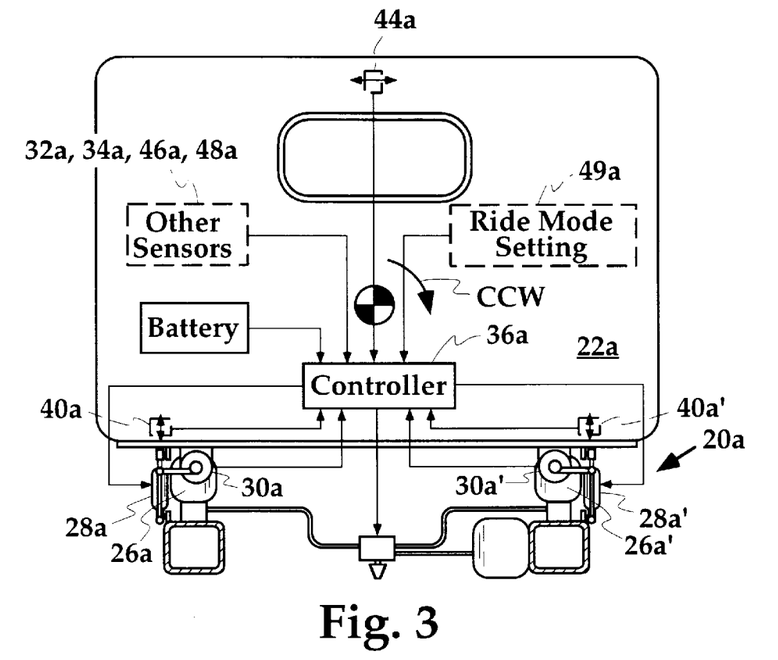
FIG. 3 is a rear view of another embodiment of the suspension system.

FIG. 3 illustrates an alternative embodiment of the cab suspension system 20a. This system 20a differs from the previous embodiment in that multiple displacement sensors 30a, 30a' are positioned adjacent to both the flexible members 26a, 26a' and MR dampers 28a, 28a'. This configuration may provide slightly better ride control in the cab 22a as compared to the previous embodiment, as the sensors 30a, 30a' are positioned closer to dampers 26a, 26a', thereby accounting for any cross-cab dynamics or system flexibility. Preferably, leveling would be accomplished by averaging the position information from sensors 30a, 30a' and adjusting the level based upon that calculated average. Ride control signals would be derived for each damper 28a, 28a' via the afore-mentioned "Rate Control Method." Optionally, vertical acceleration sensors 40a, 40a' may be processed by controller 36a to enhance ride control according to the more sophisticated "Modified Rate Control" method. Roll motions and pitch motions (both braking and lurch) may be controlled as described in the FIG. 1 and FIG. 2 embodiment by processing inputs from speed sensor 32a, steering sensor 34a, brake sensor 46a, and throttle sensor 48a. Alternatively, position sensor information from sensors 30a, 30a' or lateral acceleration from sensor 44a may also be used to determine roll. For example, the conditioned difference (Δ position) between the vertical position sensor information, as well as direction of travel, can be used to determine and control the roll. Accordingly, this conditioned Δ position signal may be used in a calculation or lookup table to derive the roll control signal (See FIG. 12–14b). The optional ride mode setting switch 49a comprises a three position switch for enabling a soft, firm, or complete lock up of the dampers 28a, 28a' at the driver's command as mentioned before.

Figure 4:
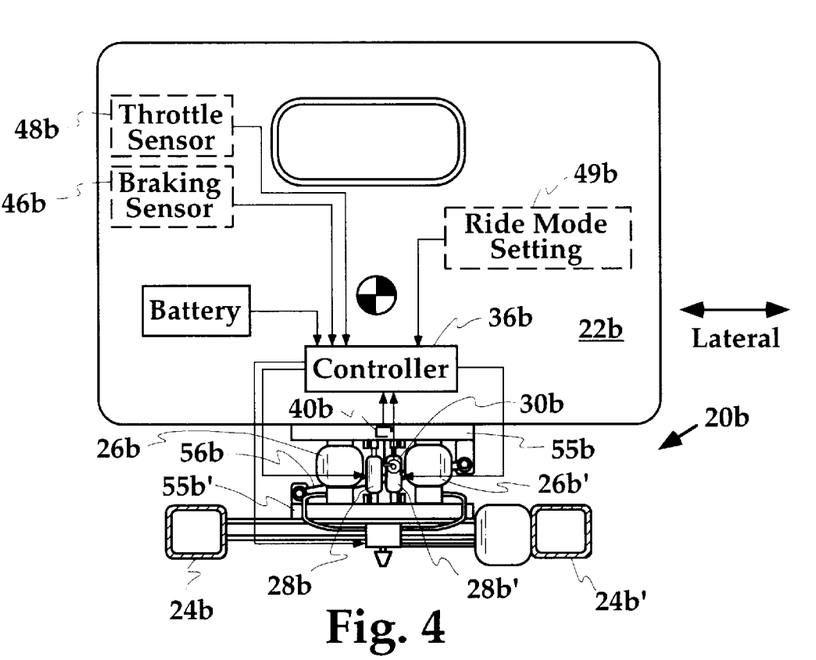
FIG. 4 is a rear view of another embodiment of the suspension system.

FIG. 4 illustrates an alternative embodiment of the cab suspension system 20b. In this embodiment, the flexible members 26b, 26b' and dampers 28b, 28b' are interconnected between bracket assemblies 55b, 55b'. Bracket assemblies 55b, 55b' attach or interconnect respectively to the cab 22b or frames 24b, 24b' or cross support member. The system 20b includes at least one sensor, such as the centrally located vertical displacement sensor 30b for providing a signal indicative of the vibration between the frame 24b, 24b' and cab 22b to the controller 36b. Optional vertical acceleration sensor 40b may be used to further enhance ride control by implementing the afore-mentioned "Modified Rate Control" algorithm. Ride mode setting 49b is used to control the ride mode (soft, firm, or locked) of the cab 22b relative to the frame 24b, 24b'. Braking pressure sensor 46b may be used as described in FIG. 20b to better control pitch motion. Throttle position sensor 48b is used as described in FIGS. 19b to control cab lurch. A linkage 56b attaches between bracket assemblies 55b, 55b' to restrain lateral movement. Generally, some sort of lateral restraint is desired for all the systems described herein, but is considered peripheral to the invention described herein, thus it has not been shown in the FIGS. 1–2, 3 and 5a, 5b embodiments.

Figure 5A:
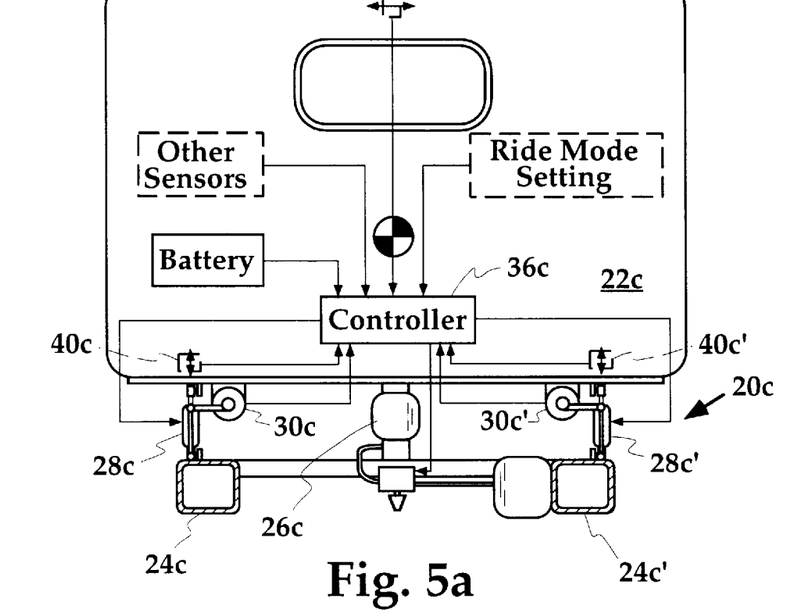
FIG. 5a is a rear view of another embodiment of the suspension system.

FIG. 5a illustrates an alternative embodiment of the cab suspension system 20c. This system 20c differs from the previous embodiments in that a single flexible member 26c is positioned centrally below the roll center. The controllable dampers 28c, 28c' and vertical position sensors 30c, 30c' are spaced laterally apart from the longitudinal roll axis and interconnect between the cab 22c and frames 24c, 24c'. Control may be to accomplish a desired ride, lock-up, roll, pitch, or lurch, as before described. Alternatively, a single centralized position sensor may be used as described with reference to FIG. 1 and FIG. 2. Optional accelerometers 40c, 40c' may be used if a "Modified Rate Control" algorithm is implemented.

Figure 5B:
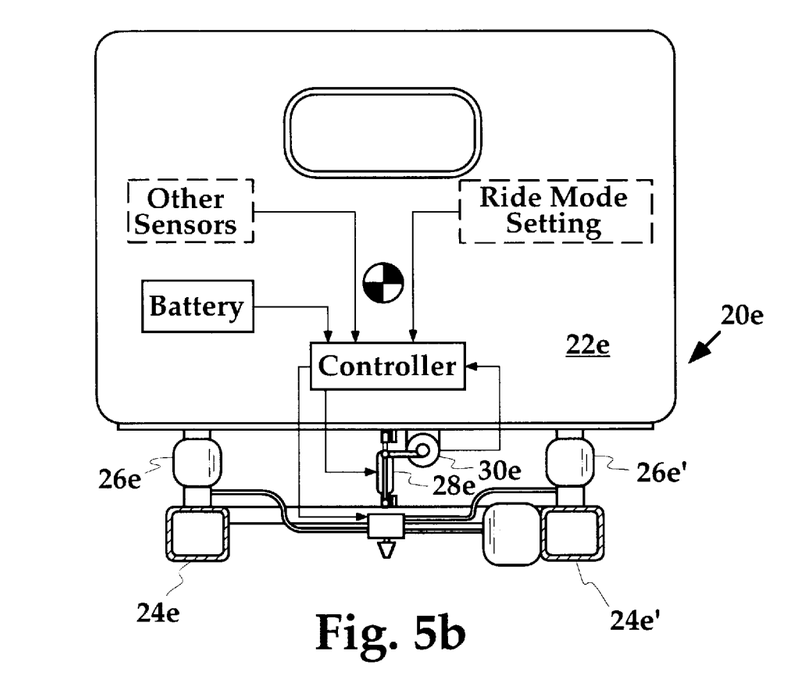
FIG. 5b is a rear view of another embodiment of the suspension system.

FIG. 5b illustrates another alternative embodiment of the cab suspension system 20e. This system 20e differs from the previous embodiments in that a two flexible members 26e, 26e' are spaced laterally apart from the longitudinal roll axis and interconnect between the cab 22e and frames 24e, 24e'. A single controllable damper 28e and vertical position sensor 30e are positioned centrally below the roll center and interconnect between the cab 22e and frames 24e, 24e'. Any of the afore-mentioned controls may be implemented.

FIG. 6 illustrates an embodiment of controllable fluid damper 28c, such as an MR damper, which may be used in the afore-mentioned controllable cab suspension systems 20 (FIG. 1 and FIG. 2), 20a (FIG. 3), 20b (FIG. 4), 20c (FIG. 5a) and 20e (FIG. 5b). The controllable damper 28c is comprised of a preferably cylindrical hollow damper body 50c which is partially closed at a first end by end cap 52c and fully closed at a second end by end cap 52c'. A slender rigid piston rod 64c is slidably and sealingly received in an aperture 54c formed within bushing 59c and sealed by seal 58c, both of which are supported within end cap 52c. The end cap 52c is secured and restrained from axial movement via crimping the damper body 50c over end cap 52c. The piston rod 64c is secured to a piston assembly 62c at one end thereof, via threads, or the like. Rod end 66c is fixedly secured to the other end of piston rod 64c via threads (not shown), or the like. The rod end 66c and end cap 52c' are interconnected to the cab 22c and frame 24c via brackets 68c, 68c' and fasteners 70c, 70c', or other suitable interconnection methods. Preferably, some kind of motion accommodating joint is present at each end of the damper. For example, polymer bushes 45c, 45c' may be included in rod end 66c and cap 52c to accommodate pivoting and reduce side loads to rod 64c. Likewise, any type of spherical or elastomer joint which will accommodate cocking/pivoting motion may be used.

The controllable damper 28c includes an accumulator 72c comprised of a partition 76c, such as a diaphragm, and gas chamber 74c. The accumulator functions to accommodate the fluid 88c displaced when the piston rod 64c enters into the internal chamber 65c. A fill valve 51c is used to appropriately pressurize the chamber 74c. Other types of accumulators may be used, as are known to those of ordinary skill in the art. The piston assembly 62c separates the internal chamber 65c into first and second fluid chambers 67c, 67c'.

The piston assembly 62c preferably includes an axially extending annular passage 84c through which the controllable fluid, such as a MR fluid 88c may flow. The piston assembly 62c comprises a wear band 86c or wear bands manufactured from an appropriate friction reducing material and of the appropriate diameter to cause the piston assembly 62c to act as a plunger to force MR fluid 88c between the chambers 67c, 67c' as a consequence of relative motion between the cab 22c and frame 24c. A magnetic field is generated by supplying the control signal to the leads 89c which electrically interconnect to the circumferentially wound coil 78c supported within piston assembly 62c. Specifically, current i is supplied to the coil 78c via double single-strand wires 63c, 63c'. One is for incoming current and the other is for outgoing current. Suitable electrical connectors and insulators interconnect the wires 63c, 63c' and the axially extending pins attached to each end of the coil 78c. A more detailed description of MR dampers is present in commonly assigned U.S. patent application Ser. No. 08/674,179 entitled "Controllable Vibration Apparatus."

The magnetic field (a single flux line thereof being illustrated by the dotted lines shown) is directed by the pole pieces 80c, 80c' to act across the MR fluid 88c contained within the annular passage 84c. This causes a rheology change (a thickening or apparent viscosity change) which restricts flow of the MR fluid 88c through the passage 84c. If the current is high enough, the flow is stopped altogether, thus substantially locking up the MR damper 28c and resultantly locking up and preventing motion between the cab 22c and frame 24c. Notably, the current I is preferably rapidly switched from a high current value to a low current value (depending upon the sensor inputs) to accomplish real time changes in damping when implementing ride control. Other piston configurations of MR dampers may be found in U.S. Pat. Nos. 5,277,281 and 5,284,330. Likewise, other types of controllable fluid dampers may be used, such as an Electrorheological (ER) fluid damper as is described in U.S. Pat. No. 5,522,481 to Watanabe, an Electrophoretic (EP) fluid damper as is described in U.S. Pat. No. 5,018,606 to Carlson, or the like.

FIG. 7 illustrates a flow chart describing the steps involved in deriving the total control signal to be provided to the afore-mentioned dampers (for example 28, 28' in FIG. 1). The control routine continuously receives and processes the input signals from the various sensors, such as the roll sensors (speed and steering, lateral acceleration, vertical accelerations, or vertical positions), ride sensors (vertical position or vertical position and vertical acceleration), throttle position sensor, and braking pressure sensor within input blocks 90–90c. Based upon these inputs, various parameters are determined such as a roll force estimate, damping condition, lurch, and pitch in calculation/filter blocks 91–91c. From these calculations and/or filtering operations, the various control signals are derived in derivation blocks 92–92c. The derivation can be through an additional calculation where the parameters are inputs to an equation or an extraction from a lookup table, where a value corresponding to the parameter is extracted from the table. Each will be described in more detail with reference to FIGS. 10–21.

Notably, the ride control signal may be determined according to any of the known control algorithms, such as the afore-mentioned "Rate Control Method" or "Modified Rate Control" methods or by other known methods, such as described in U.S. Pat. Nos. 3,807,678, 4,821,849, 4,881,172, 4,887,699, 4,936,425, 5,276,623, or 5,390,121. Further, the ride control may also include end stop control as described in U.S. Pat. Nos. 5,276,622 or 5,276,623. Each of the control signals (Roll, Ride, Lurch, and Pitch) are summed at summing block 93 to derive the total control signal. This total control signal is then provided to the dampers in drive signal block 94. Notably, once the control signal is derived, the process is repeated, such that the control signal is constantly updated in real time. The update occurs very rapidly, repeating every several milliseconds. The ride mode setting switch 49 determines which preprogrammed setting is desired, for instance, the low damping, high damping, or completely locked setting.

Figure 8:
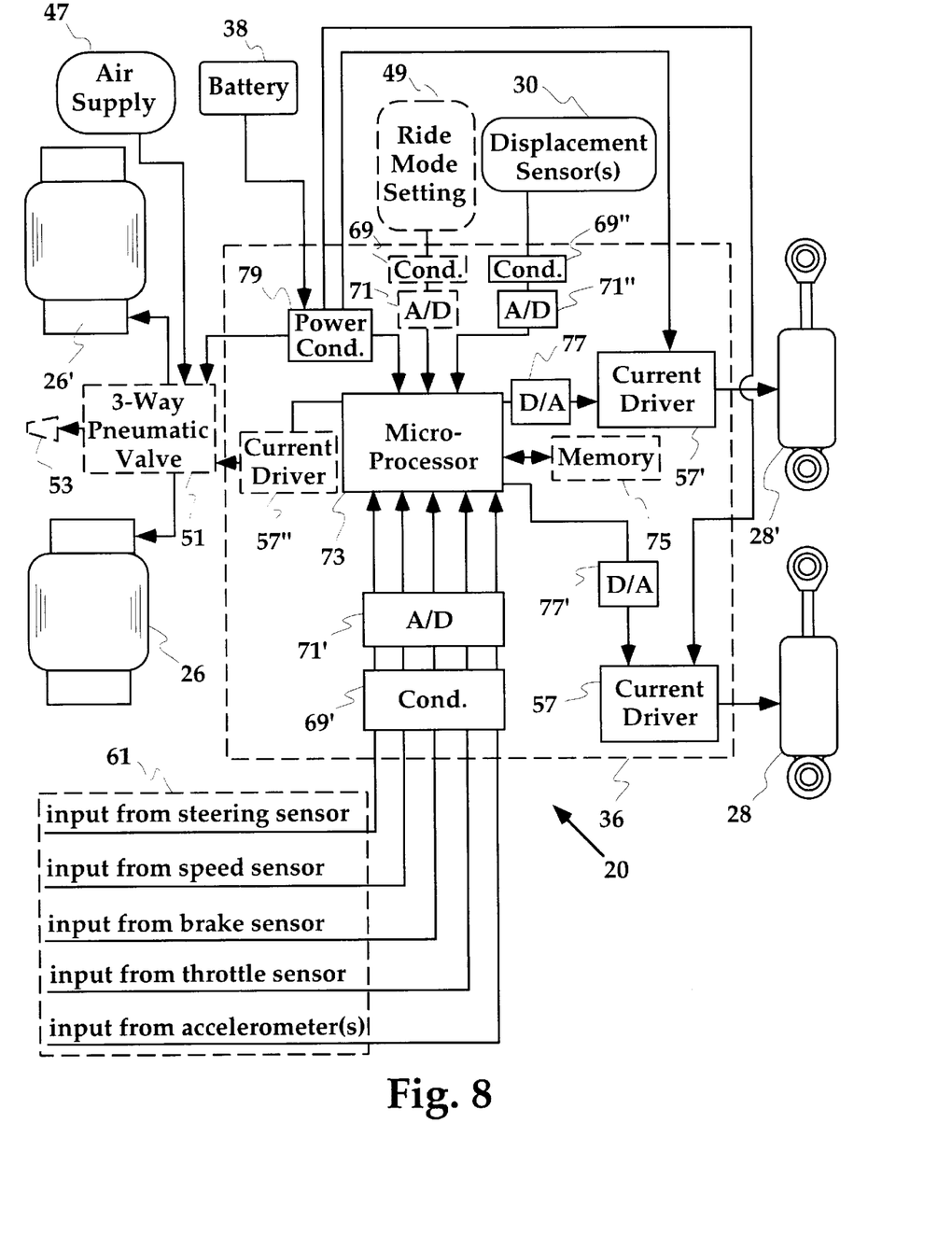
FIG. 8 is a schematic block diagram illustrating an embodiment of the controllable suspension system and illustrating the components therefor.

FIG. 8 is a block diagram illustrating the components of the cab suspension system 20 shown in FIG. 1 and FIG. 2. Inputs from the various sensor(s) in the sensors block 61 and from displacement sensor 30 and ride mode setting 49 are conditioned in conditioners 69, 69', 69", converted in Analog-to-Digital (A/D) converters 71', 71", and provided as inputs to the microprocessor 73. The conditioners 69, 69', 69" described herein may be low pass filters, high pass filters, or band pass filters as determined applicable for each application to provide the appropriate clean input signal. The conditioning is preferably included within controller 36, but may optionally be included within the sensor/electrical switch. The electrical sensors/switches shown are preferably analog devices, thereby necessitating A/D converters 71, 71', 71". The microprocessor 73 may include resident or, optionally, peripheral memory 75. For example, a 68HC 705 B16 by Motorola with resident memory may be used. The microprocessor 73 processes the digital input signals and derives a digital total control signal which is converted to analog form in Digital-to-Analog (D/A) converters 77, 77' and provided to current drivers 57, 57' which provide the total control signal to the controllable dampers 28, 28'. The total control signal may include contributions controlling ride, roll, pitch, or lurch. Ride mode setting 49 allows the user to change the parameter settings to control the on-state damping commands that are sent to dampers 28, 28', thereby enabling the driver to change the cab ride feel or to lock up the cab.

Figure 9:
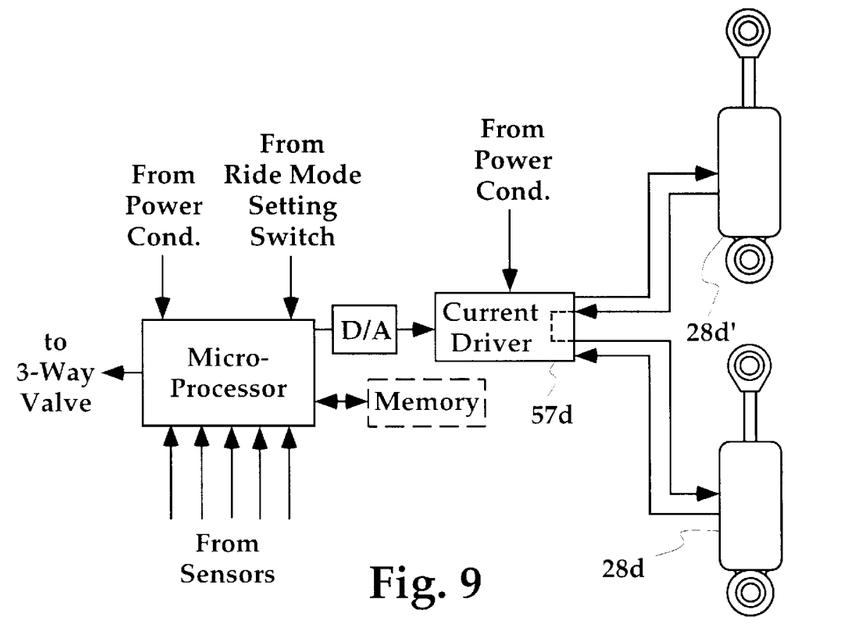
FIG. 9 is a schematic block diagram of an alternate embodiment.

The microprocessor 73 may also implement leveling by supplying a leveling signal to the current driver 57", thereby providing a leveling signal to control 3-way pneumatic valve 51. Valve 51 is opened to one of three positions. A first open position supplies air from air supply 47 into air springs 26, 26' to inflate them. The second open position in valve 51 exhausts air from air springs 26, 26' to exhaust silencer 53 to deflate them. The third (closed position) maintains the desired pressure in the air springs 26, 26' to keep the system at the proper level (generally mid stroke of the average displacement of the damper(s) 28, 28'). Generally, there will be some null band and low pass filtering of the position signals such that the leveling routine will not respond to dynamic perturbations. Two current drivers 57, 57' are shown, each separately used to provide a total damping control signal to dampers 28, 28'. Optionally, there could be only one driver 57d to control both dampers 28d, 28d' as shown in FIG. 9 where the dampers 28d, 28d' are wired in electrical series relationship. The power to the system 20 is provided by the vehicle's battery 38, which is conditioned by power conditioner 79 (see FIG. 8).

Figure 10:
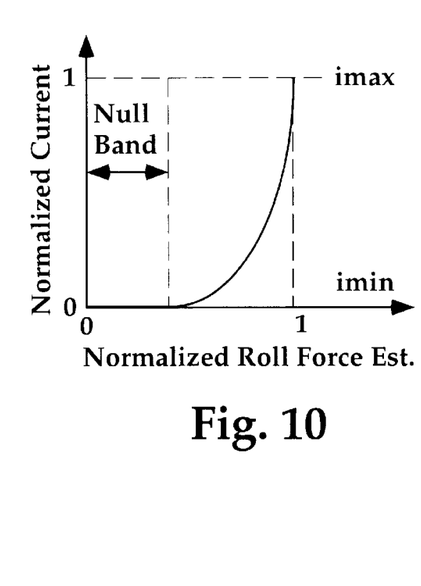
FIG. 10 is a plot of Normalized Current versus Normalized Roll Rate.
Figure 11:
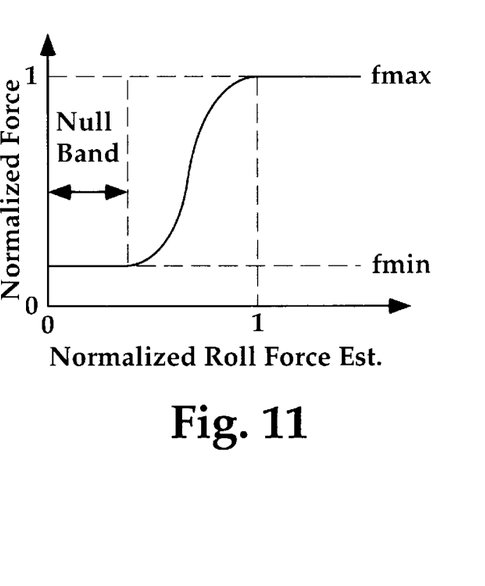
FIG. 11 is a plot of Normalized Force versus Normalized Roll Rate.

FIG. 10 and FIG. 11 describe the profiles of Normalized Current and Normalized Force as a function of Normalized Roll Force Estimate. This type of roll control is implemented when the roll force estimate is determined via using the afore-mentioned steering angle and speed information. As seen in FIG. 10, the current supplied to the dampers varies as a function of roll force estimate. First the roll force estimate is determined according to empirical Equation 1, then the value of current is extracted from an equation or from a lookup table (see FIG. 21) where column A is normalized roll force estimate and column B is normalized current. Normalized current versus Normalized Roll Force Estimate is plotted in FIG. 10 and illustrates ramping up of the current supplied as the Roll force estimate increases. The resultant Normalized Force versus Normalized is plotted in FIG. 11. As can be seen, there is a roll force estimate null band, such that small values of roll force estimate are not reacted to. However, upon exceeding the predetermined null band value, the current supplied ramps up quickly according to the predetermined profile stored in the lookup table (see FIG. 21).

Figure 12A:
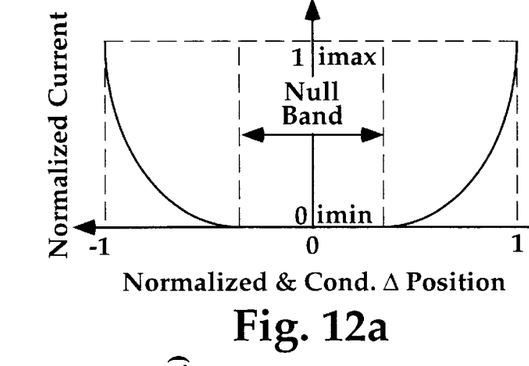
FIG. 12a is a plot of Normalized and conditioned Δ Position versus Normalized Current.
Figure 12B:
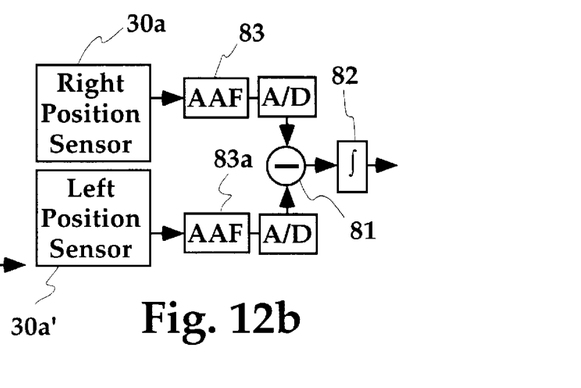
FIG. 12b is a block diagram illustrating processing of the position sensor information.
Figure 21:
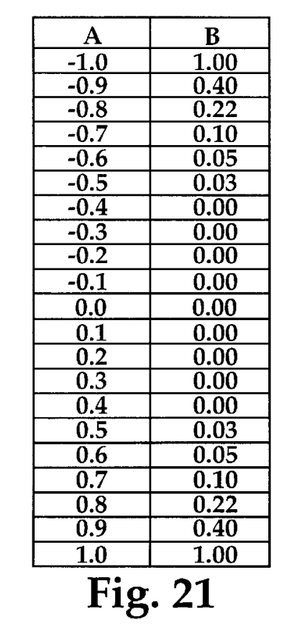
FIG. 21 is a lookup table.

FIGS. 12a and 12b describes the profile applied for controlling roll when the signals to derive the onset of roll are obtained from the displacement sensors (FIG. 3). The signals from sensors 30a, 30a' (FIG. 3) are filtered through individual low pass anti-aliasing filters 83, 83a. The result is then digitized in an A/D converter. The filtered and digitized signals are then subtracted at subtraction junction 81 to derive the filtered difference signal (Filtered Δ Position). The signal is then passed through a digital integrating filter 82 to remove any DC portion which could be caused by sustained winds, unequal loads, etc. The filter 82 includes a time constant which is set between 1–5 seconds depending on the particular characteristics of the cab system. The filtered and integrated difference signal may then be normalized such that 0 represents the minimum and 1 represents the maximum signal from the sensors. This normalized, integrated, and filtered Δ position signal (Normalized & Cond. Δ Position) is then used to extract a current value from a lookup table, such as shown in FIG. 21, where column A would represent the filtered difference (Normalized & Cond. Δ Position) and column B would represent the Normalized Current value. The normalized current value would be multiplied by an appropriate gain to obtain the roll control signal to be provided to both dampers 28a, 28a' (ex. FIG. 3). Optionally, the Normalized & Cond. Δ Position signal could be used in an equation to derive the roll control signal.

Figure 13:
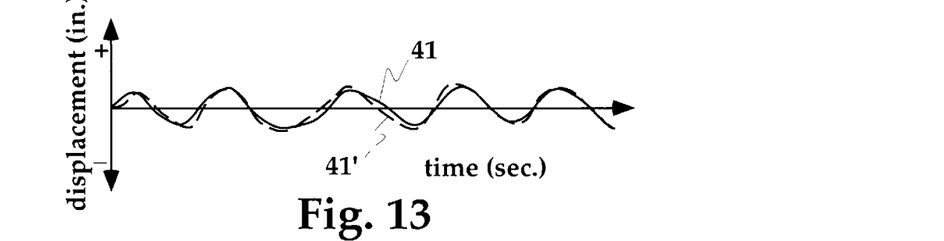
FIG. 13 is a time domain plot of displacement for right and left position sensors indicating no roll event.
Figure 14A:
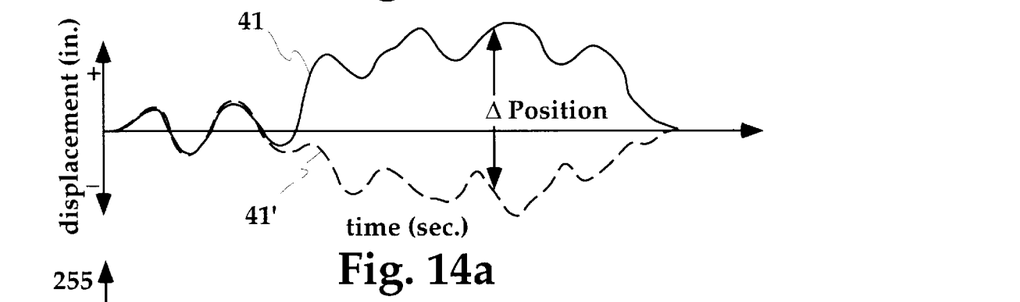
FIG. 14a is a time domain plot for the position sensors indicating a roll event.
Figure 14B:
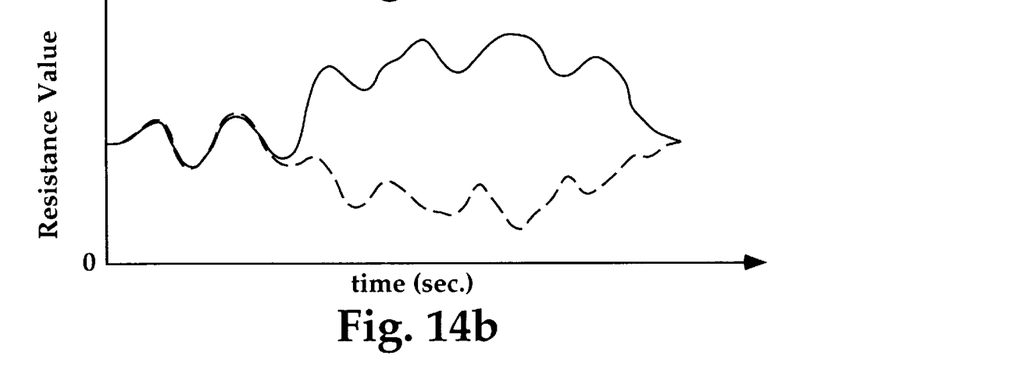
FIG. 14b is a time plot of resistance values from right and left position sensors indicating a roll event.

FIG. 13 illustrates the time domain plot of the displacement at the locations of sensors 30a, 30a' when no roll event is applied to the cab. Trace 41 indicating the displacement at right sensor 30a and trace 41' indicating the displacement at left sensor 30a' (FIG. 3). FIG. 14a illustrates the divergence of the traces 41, 41' of displacement when a roll event is encountered. In particular, the values indicate a counter clockwise roll of cab 22a (FIG. 3). FIG. 14b is a corresponding time domain plot of the actual digitized sensor values which range from a minimum resistance value of 0 to a maximum value of 255.

Figure 15A:
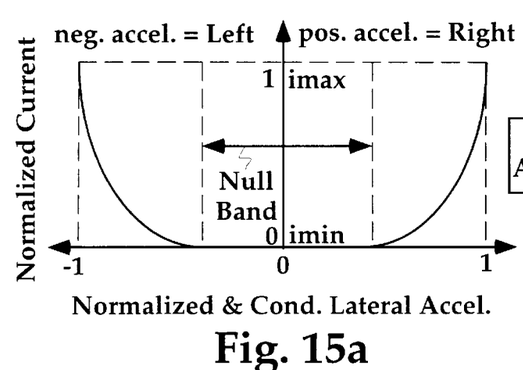
FIG. 15a is a plot of Normalized and Conditioned Acceleration versus Normalized Current.
Figure 15B:
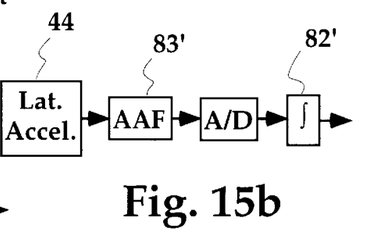
FIG. 15b is a block diagram illustrating processing of the lateral acceleration signal.

FIG. 15a illustrates a profile controlling roll based upon inputs from a lateral accelerometer, such as lateral accelerometers 44 (FIG. 2), 44a (FIG. 3). By way of example, the lateral acceleration from accelerometer 44 is filtered by anti-aliasing filter 83'. That exiting signal is converted within an A/D converter and then passed through a integrating filter 82' as shown in FIG. 15b. Optionally, the signal may then be normalized. Its corresponding output value is extracted from a lookup table, such as in FIG. 21, where column A is the Normalized and Conditioned Lateral Acceleration and column B represents the Normalized Current. Again, a null band is implemented to limit the reaction to small values of Normalized and Conditioned Acceleration.

Figure 16A:
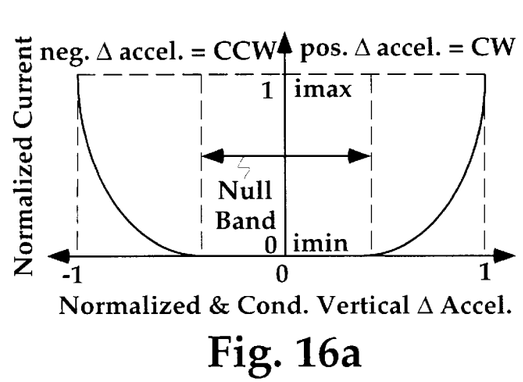
FIG. 16a is a plot of Normalized and Conditioned Vertical Δ Acceleration versus Normalized Current.
Figure 16B:
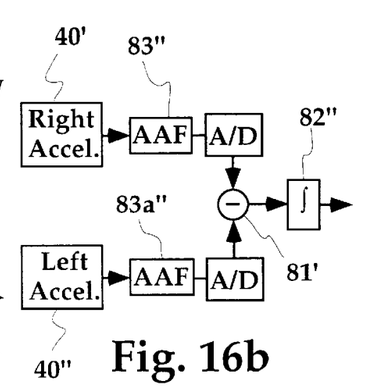
FIG. 16b illustrates processing of the right and left vertical acceleration signals.

FIG. 16a describes a profile applied for controlling roll when the signals from the optional vertical acceleration sensors 40', 40" (FIG. 2) are used to derive the onset of cab roll. The right and left signals from right and left sensors 40', 40" (FIG. 2) are filtered through anti-aliasing filters 83", 83a" as shown in FIG. 16b and then through an A/D converter. The filtered and digitized signals are then subtracted in subtraction junction 81' to derive a filtered acceleration difference signal. The filtered difference signal would be passed through a integrating filter 82" to remove DC components. The time constant would be set between 1–5 seconds depending on the particular cab system. The Integrated & Filtered Vertical Δ Acceleration values are preferably normalized such that 0 represents the minimum and 1 represents the maximum signal from the sensors. This Normalized & Conditioned Δ Acceleration signal is then used to extract a Normalized Current value from a lookup table, such as shown in FIG. 21, where column A would represent the Normalized & Conditioned Δ Acceleration values and column B would represent the Normalized Current value. The current value would be multiplied by an appropriate gain to obtain the roll control signal to be provided to both dampers 28, 28' (FIG. 2). Optionally, the Normalized & Conditioned Δ Acceleration signal could be used in an equation to derive the roll control signal.

Figure 17:
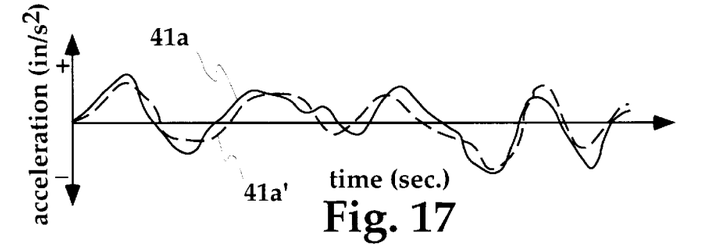
FIG. 17 is a time domain plot of vertical cab acceleration at the positions of left and right accelerometers.
Figure 18:
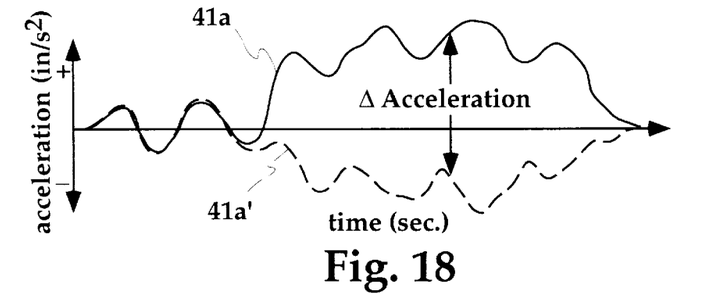
FIG. 18 is a time domain plot of vertical cab acceleration indicating a roll event.

FIG. 17 illustrates the time domain plot of the acceleration signals at the locations of vertical acceleration sensors 40', 40" when no roll event is applied to the cab. Trace 41a indicates the acceleration at right sensor 40' and trace 41a' indicates the acceleration at left sensor 40" (FIG. 2). FIG. 18 illustrates the divergence of the acceleration traces 41a, 41a' when a roll event is encountered where Δ Acceleration represents the difference.

FIG. 19a illustrates a representative normalized throttle position sensor signal versus time representing a driver accelerating and shifting through the gears. This type of rapid acceleration by the driver may cause lurch, depending on the position of the roll center of the vehicle, its gearing, load carried, etc. Accordingly, cab lurch (a type of pitching motion) may be minimized by an aspect of the present invention. In particular, when the driver rapidly accelerates by pressing quickly on the accelerator pedal, the throttle sensor 48–48c (FIG. 1–5) sends a signal to the controller. By way of example, a throttle position signal from throttle sensor (ex. 48) is first filtered by an anti-aliasing filter (AAF) 83''', then digitized by an A/D converter, then integrated in a digital integrating filter 82''' having a time constant of between 1–5 seconds (selected based upon cab kinematics and dynamics). The signal is further then multiplied by a factor as shown in FIG. 19b and is then preferably normalized. Preferably, speed sensor information from speed sensor 32 is passed through a function (equation, lookup table, etc.) to determine a multiplication factor which varies as a function of speed in block 85. That multiplication factor is multiplied by the filtered and integrated throttle sensor signal such that the lurch control signal is effectively disabled for high speed yet is enabled at low speed. Preferably the multiplication factor starts at one at low speed and drops to zero at higher speeds. The normalized, multiplied, filtered and integrated signal is then used to extract a corresponding value from a lookup table, such as shown in FIG. 21, where column A would represent normalized and conditioned throttle position and column B represents normalized current. The resulting profile, including null band, is shown in FIG. 19c.

Figure 20A:
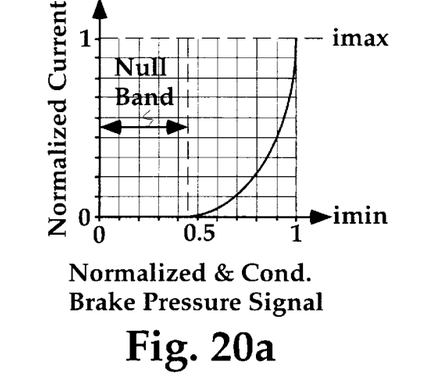
FIG. 20a is a plot of Normalized and Conditioned Brake Pressure Signal versus Normalized Current.
Figure 20B:
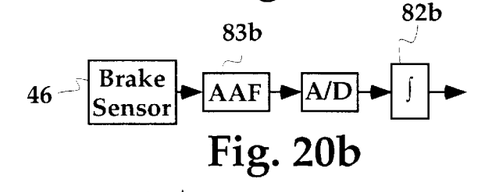
FIG. 20b is a block diagram illustrating processing of the brake pressure signal.

Pitch control due to braking would operate in a similar fashion as lurch control, as shown in FIGS. 20a and 20b. The brake sensor signal from brake sensor (ex. 46) is filtered by anti-aliasing filter 83b and then integrated in digital integrating filter 82b. The signal would then preferably be normalized. The normalized and conditioned signal may then be used to extract from a lookup table the current signal, as from a lookup table such as FIG. 21, where column A would represent normalized and filtered brake pressure and column B represents normalized current.

In summary, the present invention is a controllable secondary suspension system supporting a vehicle cab relative to a vehicle frame, comprising at least one flexible member flexibly suspending the vehicle cab relative to the frame, at least one controllable fluid damper housing, a field responsive fluid interconnected between the cab and the frame, and means for controlling damping of said at least one controllable fluid damper to control motion of the cab relative to the frame. Accordingly, the means for controlling damping may comprise controller which receives driver input from a simple ride mode setting to control damping level or to lock up the cab, or it may include input from one or more sensors to control ride alone, simultaneously control ride and roll or ride and pitch (due to braking or lurch or both), or all combined.

While several embodiments, including the preferred embodiment of the present invention, have been described in detail, various modifications, alterations, changes, and adaptations to the afore-mentioned may be made without departing from the spirit and scope of the present invention defined in the appended claims. It is intended that all such modifications, alterations, and changes be considered part of the present invention.

We claim:

1. A suspension system supporting a vehicle cab relative to a vehicle frame, comprising:
   (a) at least one flexible member flexibly suspending the vehicle cab relative to the frame, the at least one flexible member being an air spring;
   (b) at least one controllable fluid damper housing a field responsive fluid interconnected between the cab and the frame; and
   (c) a controller that controls a damping level of said at least one controllable fluid damper to control motion of the cab relative to the frame and that adjusts an air level in the air spring to level said cab, the air level being adjusted responsive to a position sensor.

2. A suspension system of claim 1 wherein said controller controls vertical ride of said vehicle cab responsive to a position sensor.

3. A suspension system of claim 1 wherein said controller controls vertical pitch of said vehicle cab responsive to a brake pressure sensor.

4. A suspension system of claim 1 wherein said controller controls vertical lurch of said vehicle cab responsive to a throttle sensor.

5. A suspension system of claim 1 wherein said at least one controllable fluid damper is comprised of a first controllable fluid damper transversely spaced on a first side of a longitudinal roll axis of said vehicle cab, and a second controllable fluid damper transversely spaced on an opposite side of said longitudinal roll axis and said means for controlling damping controls damping of said first controllable fluid damper and said second controllable fluid damper to control roll.

6. A suspension system of claim 5 wherein said controller is responsive to a roll force estimate.

7. A suspension system of claim 5 wherein said roll force estimate is derived from both a speed signal and a steering angle signal.

8. A suspension system of claim 5 wherein said controller is responsive to a lateral acceleration.

9. A suspension system of claim 5 wherein said controller is responsive to a difference in vertical acceleration between a first vertical acceleration from a first vertical acceleration sensor mounted on a first side of said longitudinal roll axis and a second vertical acceleration from a second vertical acceleration sensor mounted on an opposite side of said longitudinal roll axis.

10. A suspension system of claim 5 wherein said means for controlling damping to control roll is responsive to a difference between a first vertical position from a first vertical position sensor mounted on a first side of said longitudinal roll axis and a second vertical position from a second position sensor mounted on an opposite side of said longitudinal roll axis.

11. A suspension system of claim 1 wherein said controller controls vertical cab ride by rapidly switching between a low damping rate and a high damping rate responsive a position signal from a position sensor.

12. A suspension system of claim 1 wherein said controller includes input from a cab mode setting which ranges between a soft and a firm setting.

13. A suspension system of claim 1 wherein said controller includes driver input which substantially locks up vertical motion between the frame and the cab.

14. A suspension system of claim 1 wherein said controller simultaneously controls ride and pitch motions.

15. A suspension system of claim 1 wherein said controller concurrently controls ride, roll and pitch motions.

16. A suspension system of claim 1 wherein said at least one controllable fluid damper is comprised of two controllable fluid dampers which are laterally spaced apart and said controller concurrently controls ride and roll.

17. A suspension system of claim 16 wherein said concurrent control of ride and roll is accomplished by deriving a ride control signal and a roll control signal and summing said signals to derive total control signal which is provided to said two controllable fluid dampers.

18. A controllable cab suspension system of claim 1 wherein said at least one controllable fluid damper selected from a group of controllable fluid dampers consisting of:
   a) a magnetorheological fluid damper,
   b) an electrorheological fluid damper, or
   c) and electrophoretic damper.

19. A controllable cab suspension system of claim 1 wherein said controller is responsive to a position signal derived from a position sensor located substantially vertically in line with a roll axis of said cab.

20. A controllable cab suspension system of claim 1 wherein said controller processes vertical acceleration of the cab along with vertical relative displacement between the cab and frame to control vertical ride.

21. A controllable cab suspension system of claim 1 further including at least one flexible member about which the cab pivots.

22. A controllable cab suspension system for a vehicle having a longitudinal roll axis which flexibly suspends and controls movement of a cab of the vehicle relative to a frame of the vehicle comprising:
   (a) at least one flexible member flexibly suspending the cab relative to the frame,
   (b) at least one controllable fluid damper interconnected between the cab and the frame,
   (c) at least one sensor providing vibration information about the cab,
   (d) a controller for processing said vibration information to determine current to be supplied to said at least one controllable fluid damper to control damping thereof; and
wherein said controller includes driver input which substantially locks up vertical motion between the frame and the cab.

23. A controllable cab suspension system according to claim 22 wherein said controller is responsive to a difference in vertical acceleration between a first vertical acceleration from a first vertical acceleration sensor mounted on a first side of said longitudinal roll axis and a second vertical acceleration from a second vertical acceleration sensor mounted on an opposite side of said longitudinal roll axis.

24. A controllable cab suspension system for a vehicle for flexibly suspending and controlling movement of the vehicle's cab relative to the vehicle's frame, comprising:
   (a) at least two flexible elements which are laterally spaced and which flexibly suspend the vehicle's cab relative to the vehicle's frame,
   (b) at least two controllable fluid dampers which are laterally spaced and interconnected between the vehicle's cab and the vehicle's frame,
   (c) at least one position sensor providing information representative of relative displacement of the vehicle's cab relative to the vehicle's frame, and
   (d) a speed sensor for providing a speed of the vehicle,
   (e) a steering angle sensor for providing a steering angle of the vehicle, and
   (f) a controller for processing said relative displacement to derive ride control signals to control damping of said at least two controllable fluid dampers thereby controlling vertical ride, said controller further processing said speed and said steering angle to determine a roll force estimate and providing current to said at least two controllable fluid dampers to control roll motion of said vehicle's cab relative to said vehicle's frame as a function of said roll force estimate.

25. A controllable cab suspension system for a vehicle flexibly suspending and controlling movement of the vehicle's cab relative to the vehicle's frame, comprising:
   (a) two air springs which are laterally spaced about, and are located on either side of a roll axis which flexibly suspend the vehicle's cab relative to the vehicle's frame,
   (b) two magnetorheological fluid dampers which are laterally spaced about, and located on either side of said roll axis and interconnected between the vehicle's cab and the vehicle's frame,
   (c) a position sensor which is centrally located adjacent to said roll axis providing information representative of relative displacement between the cab and the frame,
   (d) at least one other sensor for providing information related to roll of the cab, and
   (f) a controller for processing said relative displacement to derive ride control signals to control damping in said two magnetorheological fluid dampers thereby controlling vertical ride, said controller further processing said information regarding a condition of roll of the cab and providing current to said two magnetorheological fluid dampers to substantially restrain roll motion of said cab relative according to a predetermined profile.

26. A controllable cab suspension system for a vehicle flexibly suspending and controlling movement of the vehicle's cab relative to the vehicle's frame, comprising:
   (a) at least one air spring for supporting the vehicle's cab,
   (b) a first magnetorheological fluid damper which is laterally spaced about, and located on a first side of a longitudinal roll axis of said cab,
   (d) a second magnetorheological fluid damper which is laterally spaced about, and located on a second side of said longitudinal roll axis, said first and second magnetorheological fluid dampers interconnected between the vehicle's cab and the vehicle's frame, (e) first sensor means for providing vibration information about the cab, (f) second sensor means for providing information related to roll of the cab, (g) means for processing said vibration information to derive ride control signals to control damping in said two magnetorheological fluid dampers thereby controlling vertical ride, and (h) means for processing said information related to roll to anticipate roll of the cab and providing current to said two magnetorheological fluid dampers to restrain roll motion of the cab.

* * * * *